US 9,878,264 B2

(12) United States Patent
Senecal et al.

(10) Patent No.: US 9,878,264 B2
(45) Date of Patent: Jan. 30, 2018

(54) METHOD AND APPARATUS FOR DISTRIBUTING MOTION SIGNALS IN A MULTI-SEAT ENVIRONMENT

(71) Applicant: D-BOX TECHNOLOGIES INC., Longueuil (CA)

(72) Inventors: Pierre Senecal, Boucherville (CA); Bruno Paillard, Sherbrooke (CA); Martin Simoneau, Sherbrooke (CA); Jean-Francois Menard, Boucherville (CA)

(73) Assignee: D-BOX TECHNOLOGIES INC. (CA)

( * ) Notice: Subject to any disclaimer, the term of this patent is extended or adjusted under 35 U.S.C. 154(b) by 297 days.

(21) Appl. No.: 14/873,322

(22) Filed: Oct. 2, 2015

(65) Prior Publication Data
US 2016/0023125 A1    Jan. 28, 2016

Related U.S. Application Data

(63) Continuation of application No. 12/731,514, filed on Mar. 25, 2010, now Pat. No. 9,178,849.
(Continued)

(51) Int. Cl.
*A63J 99/00* (2009.01)
*A63J 25/00* (2009.01)
(Continued)

(52) U.S. Cl.
CPC ............. *A63J 99/00* (2013.01); *A63J 25/00* (2013.01); *G05B 15/02* (2013.01);
(Continued)

(58) Field of Classification Search
CPC .. A63J 99/00; G05B 15/02; A63F 9/24; A63F 13/00
See application file for complete search history.

(56) References Cited

U.S. PATENT DOCUMENTS 4,066,256 A    1/1978   Trumbull
4,085,402 A    4/1978   Krygeris et al.
(Continued)

FOREIGN PATENT DOCUMENTS

CN    101355657 A    1/2009
WO    20071143849 A    12/2007

OTHER PUBLICATIONS

International Search Report from PCT/CA2010/000464, Jul. 12, 2010.
(Continued)

*Primary Examiner* — An T Nguyen
(74) *Attorney, Agent, or Firm* — Norton Rose Fulbright Canada LLP

(57) ABSTRACT

A system for providing motion signals indicative of a motion to be performed by the motion platforms synchronously with video images comprising an input interface for extracting a motion signal from the input signal. A server provides a network address to each motion platform. A motion platform interface has control ports connected to arrays of motion platforms. Each motion platform being connected one to another by a wired connection according to a control protocol. The motion platform interface individually actuates each of the motion platforms by providing a client motion signal to each motion platform comprising the motion signal with a respective network address. Each motion platform is managed according to a respective feedback signal comprising the provided network address of each motion platform.

15 Claims, 6 Drawing Sheets

Related U.S. Application Data

(60) Provisional application No. 61/163,290, filed on Mar. 25, 2009.

(51) Int. Cl.
  *H04L 29/12* (2006.01)
  *G05B 15/02* (2006.01)
  *A63J 5/00* (2006.01)

(52) U.S. Cl.
  CPC .... *H04L 29/12216* (2013.01); *H04L 61/2007* (2013.01); *A63J 2005/002* (2013.01)

(56) References Cited

U.S. PATENT DOCUMENTS

| | | |
|---|---|---|
| 4,289,997 A | 9/1981 | Jung et al. |
| 4,879,644 A | 11/1989 | Gottshall |
| 4,879,849 A | 11/1989 | Hollingsworth et al. |
| 5,015,933 A | 5/1991 | Watkins et al. |
| 5,420,485 A | 5/1995 | Campbell, Jr. |
| 5,433,670 A | 7/1995 | Trumbull |
| 5,459,382 A | 10/1995 | Jacobus et al. |
| 5,467,266 A | 11/1995 | Jacobs et al. |
| 5,509,631 A | 4/1996 | De Salvo |
| 5,568,032 A | 10/1996 | Wakui |
| 5,597,359 A | 1/1997 | Byerly |
| 5,857,917 A | 1/1999 | Francis et al. |
| 7,053,752 B2 | 5/2006 | Wang et al. |
| 7,321,799 B2 | 1/2008 | Paillard |
| 8,827,709 B1 * | 9/2014 | Gurule .................... G09B 9/08 434/45 |
| 9,178,849 B2 * | 11/2015 | Senecal .................... A63J 25/00 |
| 2004/0005927 A1 * | 1/2004 | Bonilla .................... A63H 30/04 463/42 |
| 2004/0249484 A1 | 12/2004 | Paillard |
| 2005/0233810 A1 | 10/2005 | Chiang |
| 2006/0220784 A1 | 10/2006 | Wang |
| 2006/0244564 A1 * | 11/2006 | Madsen .................... A47C 1/121 340/5.6 |
| 2007/0099708 A1 * | 5/2007 | Okada .................... A63F 13/08 463/46 |
| 2007/0111774 A1 * | 5/2007 | Okada .................... A63F 13/08 463/16 |
| 2008/0002390 A1 * | 1/2008 | Paillard .................... A63G 31/16 362/85 |
| 2008/0104289 A1 | 5/2008 | Paillard |
| 2008/0111408 A1 | 5/2008 | Duran |
| 2010/0245116 A1 * | 9/2010 | Senecal .................... A63J 25/00 340/4.21 |
| 2012/0215363 A1 | 8/2012 | Menard et al. |
| 2013/0005442 A1 | 1/2013 | Erickson et al. |
| 2016/0023125 A1 * | 1/2016 | Senecal .................... A63J 25/00 700/275 |

OTHER PUBLICATIONS

International Search Report from PCT/CA2007/001064, Sep. 6, 2007.

Korkealaakso, P.M. et al., "Development of a real-time simulation environment", Multibody System Dynamics, Kluwer Academic Publishers, DO, vol. 17, No. 2-3, Feb. 19, 2007, pp. 177-194.

* cited by examiner

METHOD AND APPARATUS FOR DISTRIBUTING MOTION SIGNALS IN A MULTI-SEAT ENVIRONMENT

CROSS REFERENCE TO RELATED APPLICATIONS

This patent application is a continuation of U.S. patent application Ser. No. 12/731,514, which claims priority from U.S. provisional patent application No. 61/163,290, entitled "Method and Apparatus for Distributing Motion Signals in a Multi-Seat Environment," filed on Mar. 25, 2009, the specification of which are both hereby incorporated by reference.

TECHNICAL FIELD

This description relates to the field of entertainment motion devices. More precisely, the description pertains to the control of motion platforms such that they are synchronized with a sequence of images.

BACKGROUND

It is desirable to provide users with motion which is synchronized with a video program for entertainment. Such motion enhances the user experience.

One solution to synchronize the motion provided by the motion platform to a video program is based on the audio track of the video program. A motion decoding unit synchronizes a previously recorded motion stream with the video program by recognizing an audio sample and matching it with its associated recorded motion sample. The synchronized motion stream is then provided to a motion platform.

If a small number of motion platforms is to be controlled, a motion decoding unit may control a plurality of motion platforms. Each motion platform needs to be provided with a motion data stream and monitored for fault management and maintenance. When the number of platforms to be controlled increases, the complexity of the motion decoding unit increases accordingly.

Providing a large number of users with motion is often cumbersome and complicated as the operator of such a system is faced with many challenges.

There is a need for a method and system that will overcome at least one of the above-identified drawbacks.

SUMMARY

In accordance with the present application, there is provided a system for providing, to a plurality of motion platforms, motion signals indicative of a motion to be performed by the motion platforms synchronously with video images, the system comprising: an input interface for receiving an input signal including said motion signal; at least one network address provider for providing a network address to each motion platform of the plurality and for individually managing each motion platform of the plurality according to the network address of each motion platform; at least one motion platform interface comprising at least one control port; and at least one array of multiple motion platforms, each of the at least one array being connected to a respective one of the at least one control port, each of the at least one array consisting of a wired connection connecting the multiple motion platforms of said at least one array one to another, said at least one motion platform interface for individually managing each of said motion platforms of the at least one array by providing a motion signal to each motion platform of said at least one array, each motion platform of said at least one array to be managed according to a respective feedback signal to be received from each of said motion platforms of said at least one array, the feedback signal of any given one of the motion platforms comprising the provided network address of the given one of the motion platforms.

Further in accordance with the present application, there is provided a system for receiving an input signal according to a control protocol and providing motion to a plurality of seats as a function of the input signal, the system comprising: a distribution network hub for providing a motion signal synchronized with a sequence of images and indicative of the motion, said hub comprising an input interface for receiving the input signal including said motion signal, and at least one motion platform interface comprising at least one control port, the at least one control port for actuating each of said seats of the plurality according to said motion signal; and at least one array of multiple motion platforms, each said motion platform adapted to support at least one seat of the plurality, each of the at least one array consisting of a wired connection connecting the multiple motion platforms of said at least one array one to another, each of said at least one array being connected to a respective one of the at least one control port, each motion platform of said at least one array being connected one to another by a wired connection to provide the motion to said seats with said motion signal.

Still further in accordance with the present application, there is provided a system for receiving an input signal according to a control protocol and providing motion to a plurality of seats as a function of the input signal, the system comprising: a distribution network hub for providing a motion signal synchronized with a sequence of images and indicative of the motion, said hub comprising an input interface for receiving the input signal according to said control protocol and for extracting said motion signal from said input signal, and at least one motion platform interface comprising at least one control port, the at least one control port for actuating each of said seats of the plurality according to said motion signal according to said control protocol; and at least one array of motion platforms each adapted to support at least one seat of the plurality, said at least one array being connected to a respective one of the at least one control port, each motion platform of said at least one array being connected one to another by a wired connection according to a control protocol to provide the motion to said seats with said motion signal.

BRIEF DESCRIPTION OF THE DRAWINGS

It will be noted that throughout the appended drawings, like features are identified by like reference numerals.

DETAILED DESCRIPTION

Figure 1A:
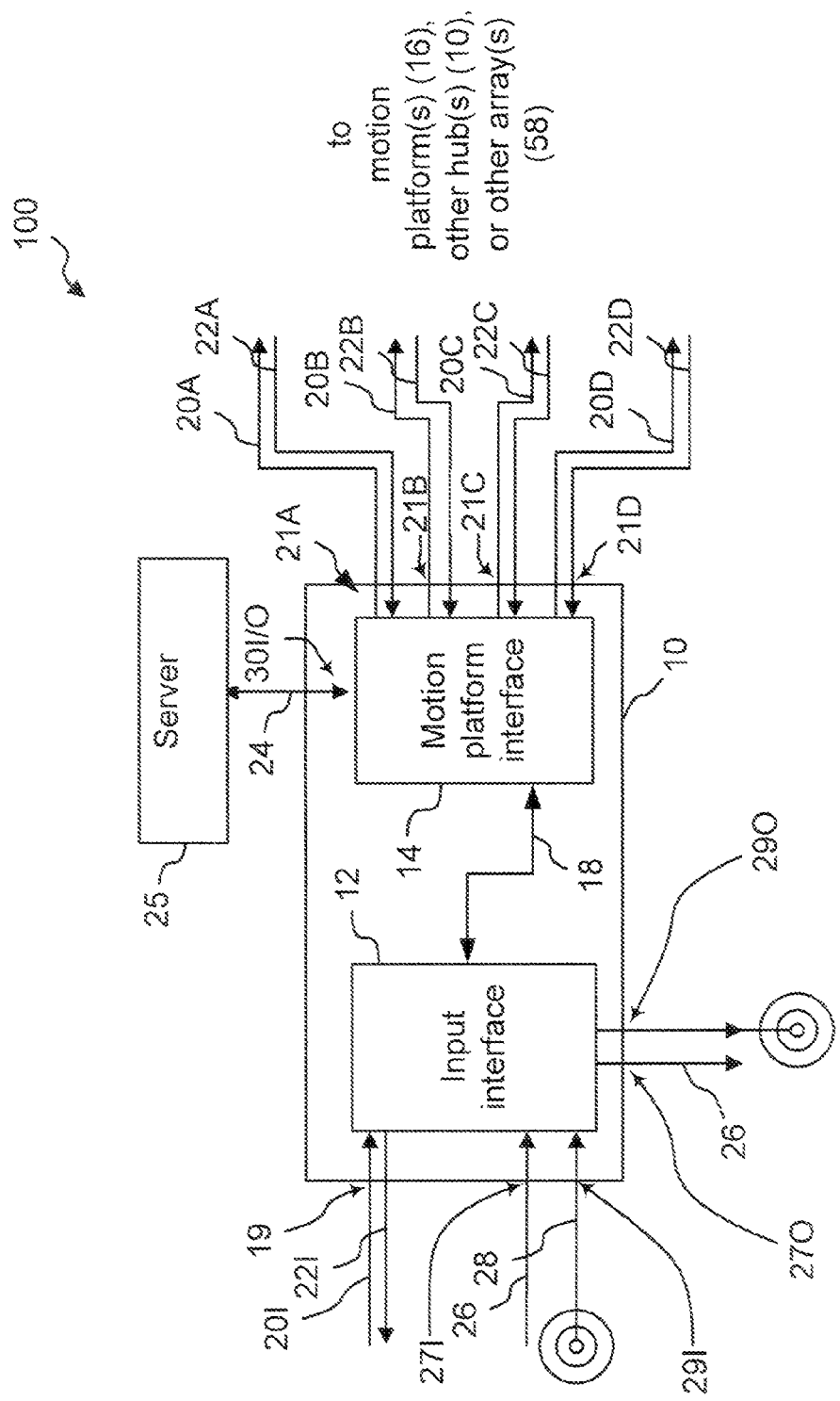
FIG. 1A is a block diagram illustrating a system for distributing motion signal to motion platforms according to an example embodiment described herein.

Now referring to FIG. 1A, there is shown a system 100 for providing motion signals and commands to a plurality of motion platforms. The system comprises a motion platform hub 10 according to the embodiment illustrated in FIG. 1A. The hub 10 is adapted to distribute motion signals, synchronized with a sequence of images, to motion platforms based on the commands received from a server 25 through connection 24 (i.e., physical or logical connection). The motion signals may be a sequence of motion samples synchronized with a sequence of images, motion commands or intentions to drive downstream motion platforms in performing pre-programmed movements, etc. It is therefore understood that a similar hub could be used for distributing a sequence of actuation samples of any appropriate type to any other type of actuation devices, including but not limited to motion platform devices.

The server 25 according to an embodiment described herein, sends commands to motion platforms through the hub 10. In one embodiment, the server 25 is a personal computer (PC), a web server or the like, in physical connection with other components of the system. In another embodiment, the server 25 can be combined with the hub 10 as a single network entity in a logical connection. In another embodiment, in order to provide seats availability or sales management, the server 25 may be combined or connected to another server such as a sales management server, a ticket server, a web server or the like.

Figure 1B:
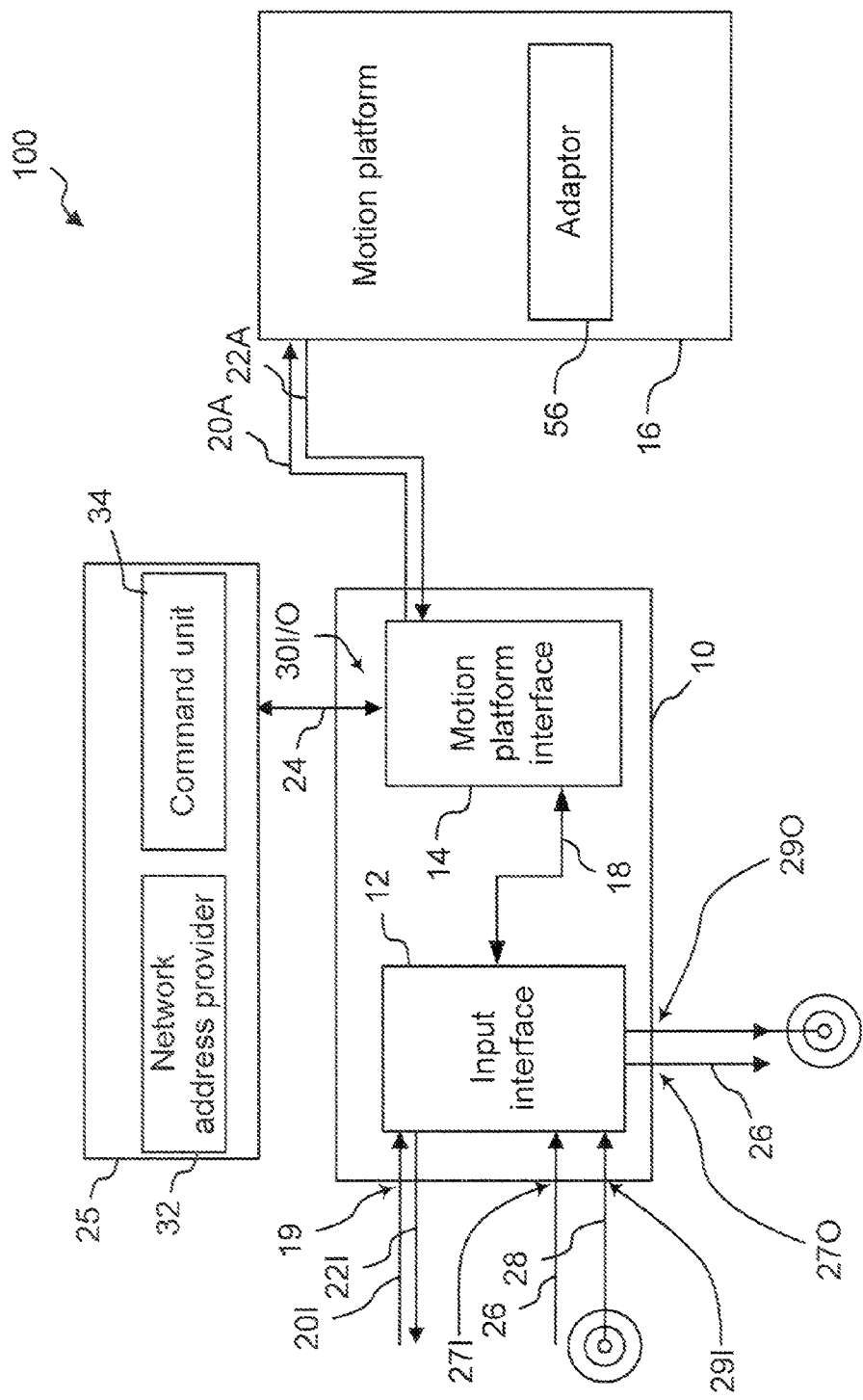
FIG. 1B is a block diagram of the system of FIG. 1A according to an embodiment showing the components of a server.

Referring now to FIG. 1B there is illustrated a detailed system 100 in which is shown a communication between a motion platform 16, the hub 10 and the server 25. In this embodiment illustrated in FIG. 2, the server 25 comprises a network address provider 32 for providing a network address for each motion platform 16. The network address provider 32 can be any kind of processor, central processing unit (CPU) or the like adapted to provide a network address, and to associate the provided address with each of the motion platform 16 in a look-up table (not shown). In another embodiment, the network address provider 32 can be adapted to provide and associate a network address for each motion platform 16 connected to different hubs. The network address can also be provided in order to follow distribution of seats, for example, in a movie theatre. In another embodiment, the network address provider 32 can store the association of the network address of each motion platform 16 in order to define a network topology of the motion platforms 16. In one embodiment, the network address can be any IP address, logical address, physical address or the like. In yet another embodiment, the network address defines a logical point-to-point association for each motion platform.

In the embodiment illustrated in FIG. 1B, the motion platform 16 is provided by D-Box Technologies Inc. The motion platform 16 comprises four mechanical actuators, each being positioned on one of the four corners of a seat where a user sits while watching a movie or video images, for example. As the movie goes on, the seat is provided with motions such as pitch, roll and vibrations, which enhances the movie experience of the user. It is noted that the motion platform may also consist of only three mechanical actuators, two in the back corners of the seat and one in the middle front of the seat. Other embodiments with a two-actuator or one-actuator configuration are also useful. Moreover, a plurality of seats may be supported by a single motion platform 16. In this embodiment, the motion platform 16 comprises an adaptor 56 for managing fault error. Depending on the type of error, the adaptor 56 may deactivate the motion platform 16. The adaptor 56 may also drive the actuators of the motion platforms 16 in accordance with motion commands received through the client motion signal 20. More specifically, the adaptor 56 may be programmed with motions to be performed upon reception of motion commands.

Reference is now made concurrently to FIGS. 1A and 1B. In this embodiment, a motion platform interface 14 receives the extracted motion signal 18 from the input interface 12, and generates a client motion signal 20A-20D for each motion platform 16 to be actuated. The client motion signal 20A-20D may also comprise the respective network address as provided by the server 25, as well as commands from the server 25. The motion platform interface 14 is to be connected to four motion platforms 16 or arrays of platforms using the four downstream control ports 21A, 21B, 21C and 21D. The skilled addressee would understand that the motion platform interface 14 may be connected to more than the four motion platforms 16 of FIGS. 1A and 1B. It is noted that, according to a control protocol, each downstream control port 21A, 21B, 21C and 21D may be a bidirectional link through which the server 25 controls and manages individually each motion platform 16 and respectively includes an output client motion signal 20A, 20B, 20C and 20D and an input feedback signal 22A, 22B, 22C and 22D. The client motion signals 20A, 20B, 20C and 20D may synchronously provide the motion signals indicative of a motion to be performed to each motion platform 16 along with the network address and/or the control data. According to the bidirectional control protocol, each motion platform 16 returns a feedback signal 22A, 22B, 22C or 22D to the motion platform interface 14. In one embodiment, the feedback signals 22A, 22B, 22C and 22D provided by each motion platforms 16, are directed to the server 25 through connection 24 and may comprise the network address identifying each motion platform sending a feedback signal 22A, 22B, 22C or 22D to the hub 10 and ultimately to the client server 25.

Figure 2:
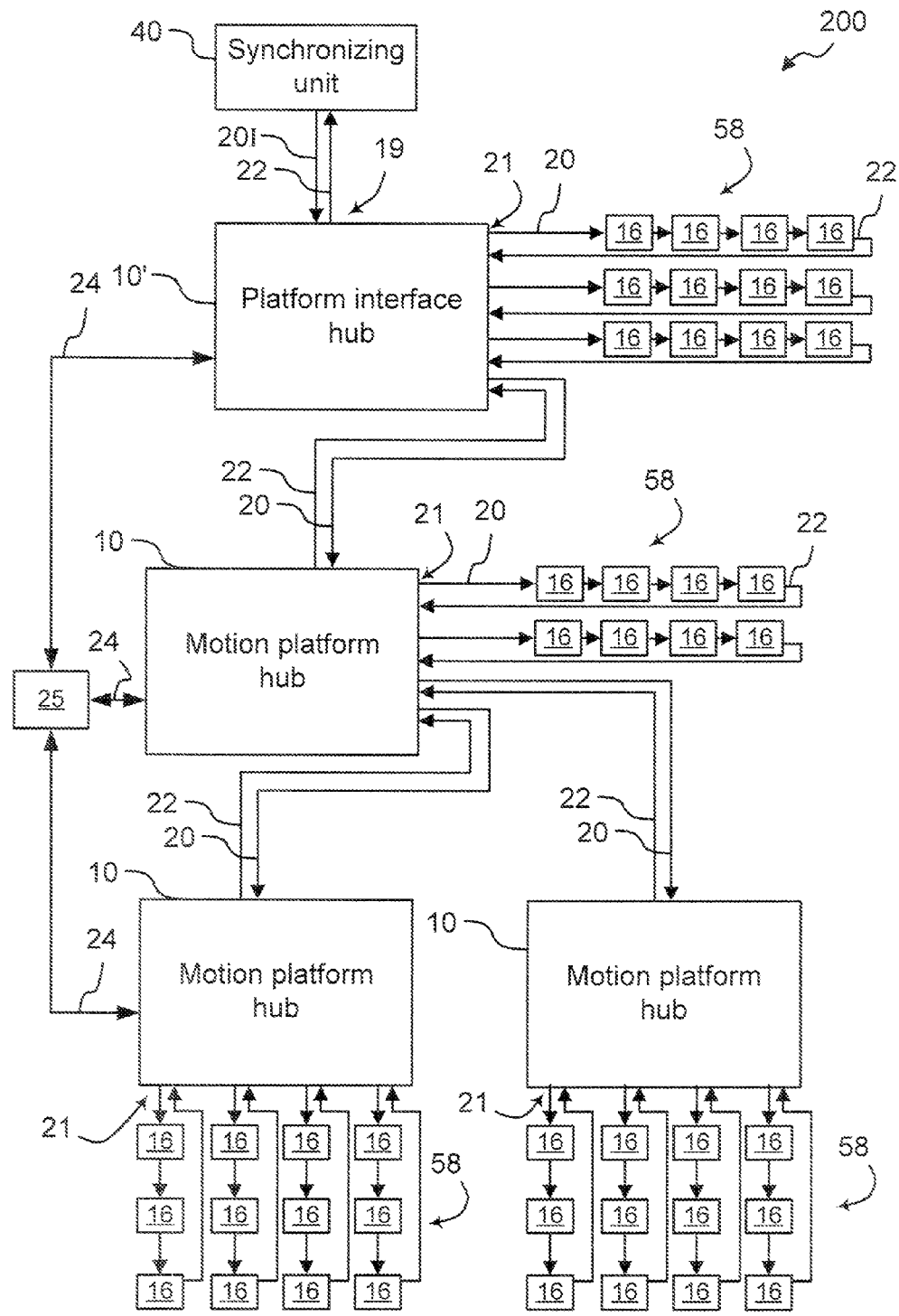
FIG. 2 is a block diagram illustrating the system for distributing motion according to one embodiment.

In one embodiment, illustrated by FIG. 2, the motion platforms 16 are connected one to another with a wired connection, to form an array 58, and the feedback signal is conveyed to the server 25 from each motion platform 16 of the array 58. The feedback signal 22 constitutes the feedback of any motion platform 16 of a given array 58, and is relayed with the network address of each motion platform 16 to the control port 21, which connects the array 58 of motion platforms 16 to the hub 10. The array 58 may form a loop with respect to the control port to which the array 58 is connected. The feedback 22 from the connected motion platforms 16 will be returned to the server 25 in any direction of the loop.

In this embodiment, the network address of each motion platform 16 is used by command unit 34 (FIG. 1B) of the server 25 for management or maintenance purposes by, for example, monitoring specific operating parameters of the motion platform 16 such as the temperature of the actuators being used, the weight, or fault information data. By detecting the weight on a motion platform 16, the presence of a user may be confirmed. In one embodiment, the command unit 34 provides commands to control each motion platform 16, for instance to turn the actuation of a platform 16 to an "on" state if a seat is attributed to a user in a movie theatre. Based on the network address of each motion platform 16, the server 25 manages the motion platforms 16 connected to the hub 10, including start-up, standby and fault management. The network address of a given motion platform 16 allows the server 25 to selectively activate or deactivate a given motion platform 16 in an array 58. Alternatively, motion platforms 16 in the array 58 can be managed by the server 25 without using a network address and without feedback, and thus without the server 25. In this embodiment, the wired connection between the motion platforms 16 in the array 58 may form a loop or a serial link with respect to the control port to which the array 58 is connected.

According to the control protocol, the server 25 repeatedly seeks feedback from each motion platform 16. For example, if communication is lost with one actuator of a motion platform 16 of an array 58 or if a failure of one platform 16 is detected during the motion playback, the adaptor 56 detects the error. Based on the type of error, the adaptor 56 may park or freeze the motion platform 16. In another embodiment, the communication between the motion platform 16 and the server 25 is maintained. The server 25 may reactivate the faulty motion platform using commands sent from the command unit 34. Under given circumstances (when failure is due to high temperature of an actuator for example), the server 25 may resume the motion control of a platform 16 that has failed after a given period of time.

In any of these faulty cases where the server 25 seeks feedback from each motion platform 16, the server 25 uses the network address to identify the appropriate faulty motion platform 16 in the array 58. Accordingly, the remaining non-faulty motion platform would operate as in a normal operation, since the faulty motion platform 16 may still relay the feedback signal from connected non-faulty motion platform 16 in a same array 58. In another embodiment, the server 25 monitors dynamically the hub 10 to gather real-time data such as, for example, the vital signs of the actuators. In yet another embodiment, the motion platforms 16 can be muted, the state of the upstream signal can be monitored, radio parameters can be monitored in the case of a wireless connection, or the hub 10 can be reconfigured (transmitter vs. receiver configuration for example, as will be described herein below).

The feedback signal 22 comprises actuator state, actuator vital signs data, and the network address of the motion platforms. This is used to provide diagnostics information to properly manage actuator faults. When the server 25 directly manages an array 58 of platforms 16 connected to one of its downstream control port 21A, 21B, 21C and 21D, this diagnostics data is gathered by the server 25. The diagnostics data of motion platforms 16 connected downstream of the hub 10 is not forwarded back upstream. If access to this data is required, the server 25 of the specific hub 10 to which the given motion platform 16 is connected reads the diagnostics data.

In one embodiment, illustrated by FIGS. 1A and 1B, the hub 10 can also receive a motion signal according to the control protocol used for controlling motion platforms 16 from another hub upstream or directly from a synchronizing unit, as will be discussed herein below. In this embodiment, the upstream control port 19 allows one or more hubs 10 to be connected downstream of another hub using one or more of its downstream control ports 21A, 21B, 21C and 21D.

In the hub 10, whenever motion data are to be sent to downstream motion platforms 16, the upstream synchronizing unit or hub broadcasts motion data according to the active state of the control protocol of the motion platform 16. When the hub 10 receives an active state input signal 20I, the motion platform interface 14 activates an appropriate downstream port 21A, 21B, 21C or 21D to which the array 58 of the motion platform 16 is connected and sends out the motion data via the appropriate client motion signal 20A, 20B, 20C and 20D, as a function of commands from the server 25.

Similarly, when the sequence of motions is ended, the upstream synchronizing unit or hub broadcasts an input signal 20I according to the standby state of the control protocol. This state and the network address of motion platforms are used to minimize the power consumption of the motion platforms and to avoid unnecessary stressing of the system when no motion is to be played. When the server 25 sees that input signal 20I received from upstream is severed or in the standby state it places the appropriate platform 16 in the standby state accordingly.

The hub 10 also comprises an input interface 12 which receives the input signal 20I according to the control protocol. The input interface 12 extracts the motion signal (e.g., sequence of motion samples) included in the received input signal 20I to subsequently provide the motion signal to the motion platform interface 14 through a motion data signal 18. The motion data signal 18 consists of the motion signal, for instance including a synchronized sequence of motion samples to be provided to the motion platforms 16 by the motion platform interface 14 and according to the network address of the motion platform 16, if applicable.

In the embodiment of FIGS. 1A and 1B, the hub 10 also comprise a wired data input/output port 30I/O to receive command data from the server 25 and to transmit feedback data 22 from the motion platforms 16 to the server 25, a wired data input port 27I and a wireless data input port 29I to receive raw or encoded sequence of motion samples. The hub 10 may also comprise a wired data output port 27O and a wireless data output port 29O to output the received sequence of motion samples. In one embodiment, the wired data input/output port 30I/O is a USB, Ethernet Internet protocol (IP) or the like. In one embodiment, the wired data input port 27I is an S/PDIF (IEC-958 type II) input port. This input may be used alternatively to the upstream control port 19 for receiving the motion signal embedded in a digital audio signal, or any other signal. In this case, the motion signal is extracted from the wired data input signal 26 by the input interface 12 to provide the motion data signal 18. The hub 10 may comprise a transceiver (not shown) which may be configured to be used as a wireless data receiver 29I to receive a wireless data signal 28 comprising the motion signal, or as a transmitter as will be discussed herein below. Only one of the three inputs 19, 27I and 29I should be active at a time. The input interface 12 simply selects the active input port or selects the proper input port based on priority if more then one input port is active. In one embodiment, the highest priority input is the upstream control port 19 and the second highest priority input is the wired data input port 27I, the wireless data receiver 29I being selected only if no wired source is present. The selection is dynamic and can change whenever a new input becomes available or an existing input is turned off. The wireless data receiver 29I only exists on receiver configured hub 10.

In any case, the extracted motion signal is forwarded to the motion platform interface 14 via the motion data signal 18 and may also be outputted at the wired data output port 27O, as well as transmitted by the wireless data transmitter 29O if the transceiver is configured as a transmitter. This allows the configuration of multiple network topologies as will be shown in reference to FIGS. 2 to 4.

The wireless data signal 28 is unidirectional and may include motion data with added redundancy for increased reliability, as well as an indication of the state of activity of the wireless signal (active or standby).

Now referring to FIG. 2, there is shown an embodiment of a system 200 for distributing to a plurality of motion platforms a motion signals that is synchronized with a sequence of images. The system 200 uses hubs 10 as described in reference to FIGS. 1A and 1B. According to the illustrated embodiment, the system 200 is a distribution network arranged in a tiered-star configuration and comprises a plurality of hubs 10 each receiving a motion signal 20 and forwarding client motion signals to arrays 58 of downstream motion platforms 16 or other hubs 10 using its downstream control port 21. The system 200 comprises a synchronizing unit 40, hubs 10, and servers 25 for controlling a plurality of arrays 58 of motion platforms 16 according to the network address of the motion platforms 16.

The synchronizing unit 40 provides an input signal 20I that is synchronized with the sequence of images. For instance, the synchronizing can be done by matching recorded motion samples with the audio track associated with the sequence of images. The audio track is inputted to the synchronizing unit 40 which recognizes an audio sample and synchronously matches it with the corresponding motion sample in a lookup table. The motion samples and their associated audio samples may be provided, for example, as a look-up table recorded on a DVD or any other storing device. An audio sequence comprising audio samples and being synchronized with the sequence of images is provided as the movie is being played. The audio samples of the audio sequence are matched with their associated motion samples to provide a sequence of motion samples. For example, the match may be made using the look-up table.

The synchronized input signal 20I is provided to a first hub 10' and then to all other hubs 10 connected in a tiered-star topology using the downstream control ports 21 of the hubs 10. Each hub 10 synchronously forwards a client motion signal comprising the motion signal and individual network addresses to its downstream control ports 21 to which motion platform(s) 16 are connected. If another hub 10 is connected to a control port 21, the upstream hub 10 may forward the synchronized input signal 20I, or extracted motion signal. Each hub 10 generates client motion signals 20 comprising the motion signal with the network address for the motion platform 16 of each array 58. As mentioned above, the motion signal 20 may not include the network address of each motion platforms 16 to be actuated if it is forwarded to other hubs 10.

The commands are used to manage individually each downstream motion platforms 16 of the arrays 58 or hubs 10 according to respective feedback signals 22 received from each unit 16 or 10 according to the control protocol. As each hub 10 may comprise arrays of motion platforms 16 and thus provides a feedback signal 22 to its upstream hub 10, the upstream hub 10 uses the network address of each motion platform 16 to provide it with a motion signal 20 accordingly.

The management of a given array 58 of motion platforms 16 is handled by a corresponding motion platform hub 10 to which a sub-group of motion platforms 16 including the given platform is connected. The management of the motion platforms 16 being made by the network address of each motion platforms, the operation of the plurality of motion platforms 16 is independent of the operation of the motion platforms 16 connected to another hub 10 or array 58, which is advantageous for maintaining the synchronization, especially in the case of a malfunction of a given motion platform 16. The synchronization aspect is centrally handled by the synchronizing unit 40 and the synchronous providing of the motion signal 20 to the motion platforms 16 is provided by the hubs 10.

Figure 3:
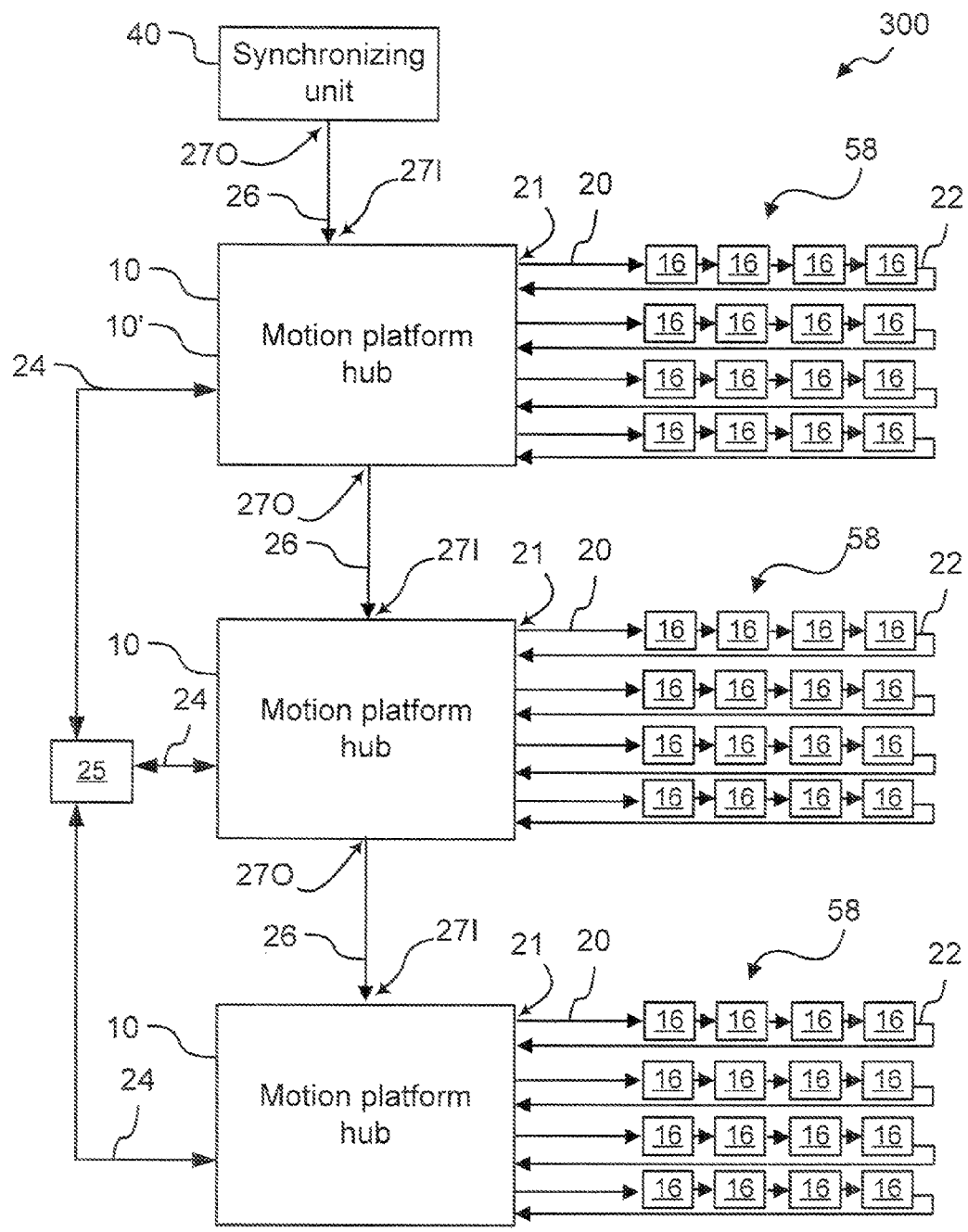
FIG. 3 is a block diagram illustrating the system for distributing motion signal to a plurality of arrays of motion platforms and incorporating where hubs are cascaded in a daisy-chain configuration using their wired data signal outputs according to one embodiment.

Now referring to FIG. 3, there is shown another embodiment of a system 300 for providing motion signals 20 that are synchronized with a sequence of images to a plurality of motion platforms 16 of an array 58. The system 300 also uses hubs 10 as described in reference to FIG. 1 but its distribution network is arranged in a substantially daisy-chain configuration using the wired data output ports 27O. System 300 and system 200 comprising similar devices, like reference numerals are used to refer to like devices having like functionalities. Accordingly, the like devices will not be repeatedly described.

The system 300 comprises a synchronizing unit 40 and cascaded motion platform interface hubs 10, each for controlling and managing a sub-group of motion platforms 16. A first hub 10' is connected to the synchronizing unit 40 via its wired data input port 27I. The first hub 10' thus receives the input signal and forwards it to the next cascaded hub 10 via its wired data output port 27O. Each subsequent cascaded hub 10 receives a wired data signal 26 at its wired data input port 27I and forwards it to the next hub 10 using its wired data output port 27O. As such, all the downstream control ports 21 of every cascaded hub 10 are available for controlling and managing motion platforms 16. The motion signal is extracted in each cascaded hub 10, with a common or multiple servers 25 providing network addresses and commands to generate client motion signals individually addressed to motion platforms 16.

In the case where the system 300 is used in a movie theatre, the hubs 10 may be located in a single control room or may be distributed in the auditorium. For example, each seat may be motion controlled using one motion platform 16 comprising four actuators (one on each leg of the seat) and each hub 10 may manage one row or one column of seats. In this case, each hub 10 has at least as much downstream control ports 21 as the number of seats per row in the theatre, unless the motion platforms 16 are arranged in an array 58.

Figure 4:
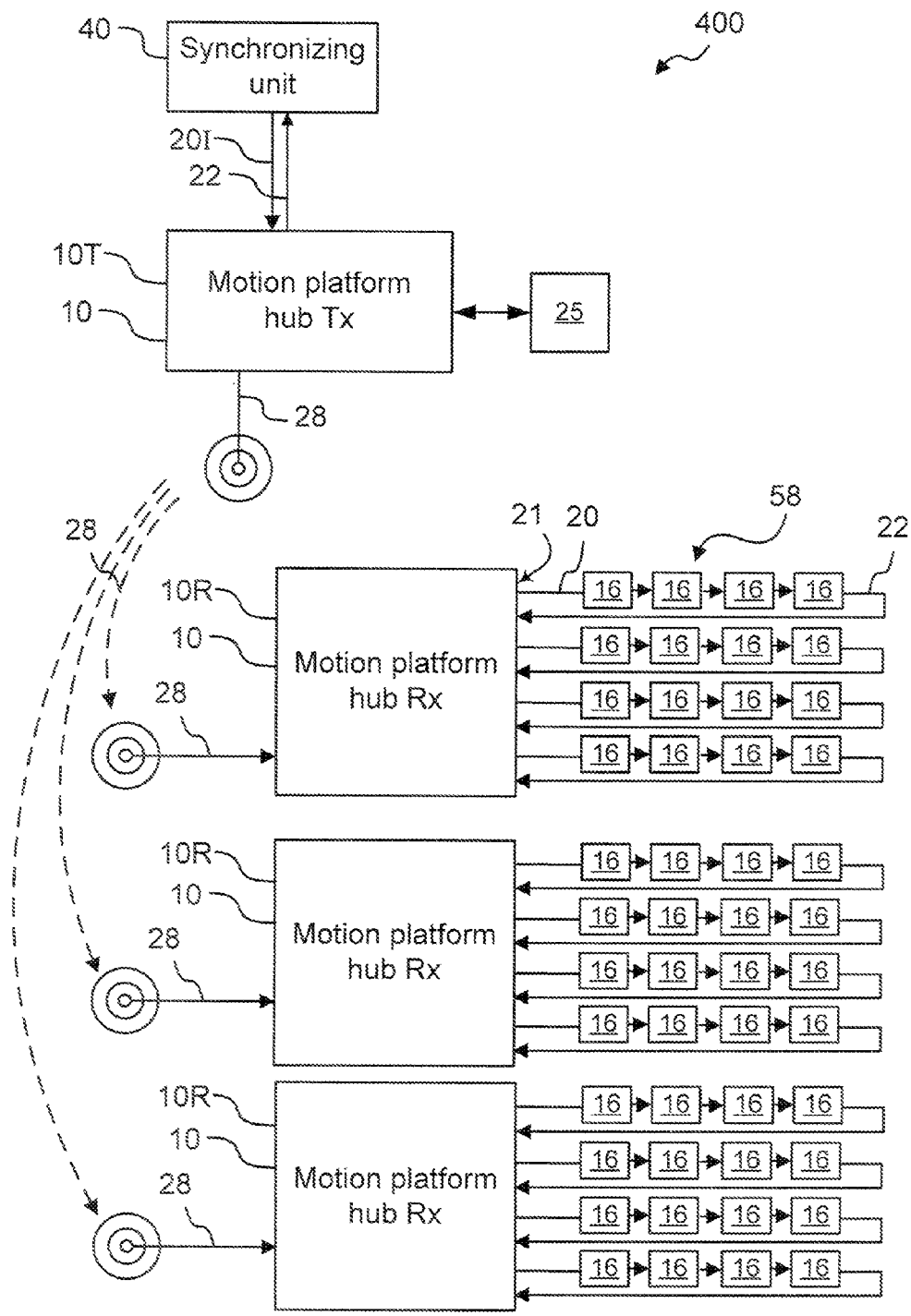
FIG. 4 is a block diagram illustrating the system for distributing motion signal to a plurality of motion platforms where hubs are wirelessly connected according to an embodiment.
Figure 5:
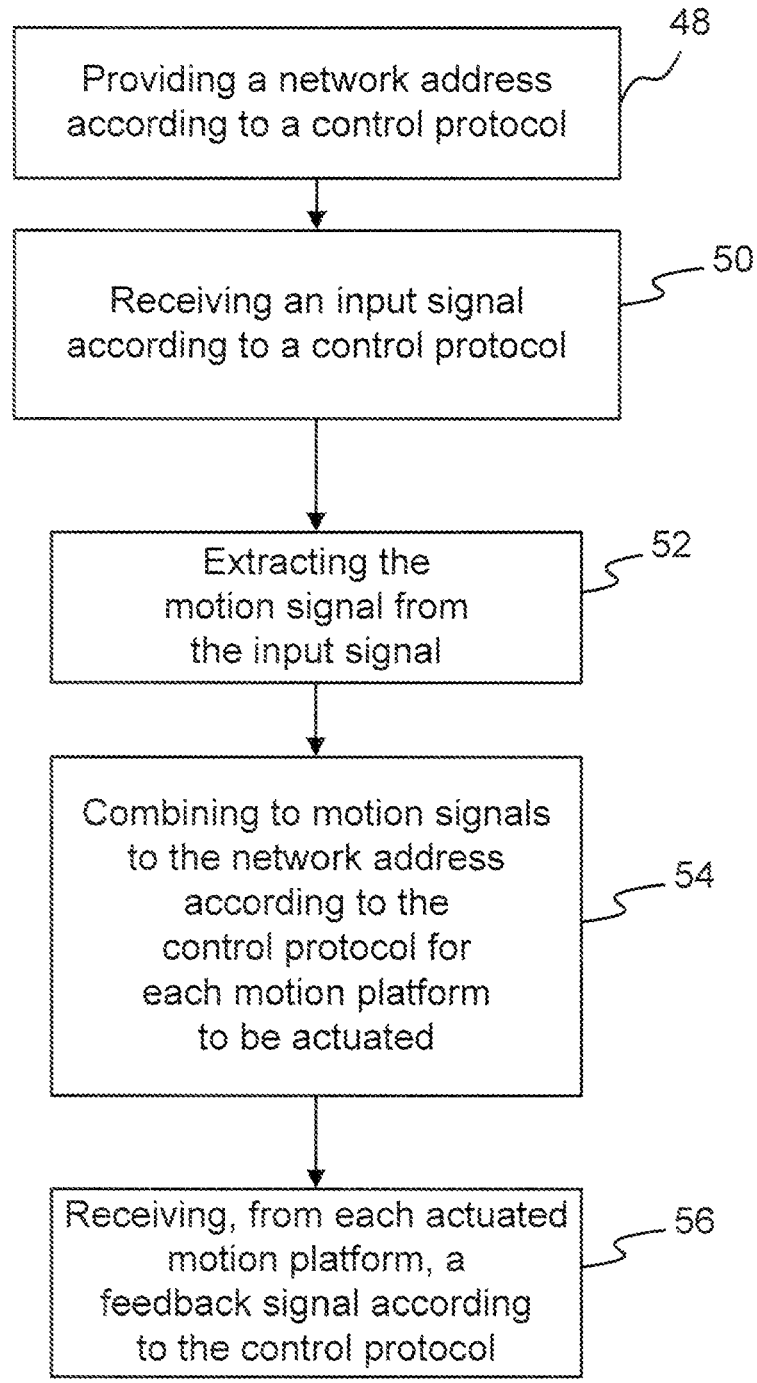
FIG. 5 is a flow chart illustrating a method for providing a motion signal to a plurality of arrays of motion platforms according to an embodiment.

Now referring to FIG. 4, there is shown still another embodiment of a system 400 for providing motion signals that are synchronized with a sequence of images to a plurality of motion platforms. The system 400 also uses hubs 10 and server 25 as described in reference to FIGS. 1A and 1B but uses wireless communication to distribute the sequence of motion samples to a plurality of motion platforms 16. Each hub 10 is thus configured either as a transmitter hub 10T or a receiver hub 10R. Systems 200, 300 and 400 comprising similar devices, like reference numerals are used to refer to like devices having like functionalities. Accordingly, the like devices will not be repeatedly described.

The system 400 comprises a synchronizing unit 40 and networked motion platform interface hubs 10, each for controlling and managing a sub-group of arrays 58 of motion platforms 16. A first hub 10T is configured to be used as a transmitter and, in the illustrated embodiment, it is connected to the synchronizing unit 40 via the downstream control port 21 of the synchronizing unit 40. The transmitter hub 10T thus receives the sequence of motion samples and wirelessly broadcasts it to a plurality of receiver hubs 10R using the wireless data receivers 29I and transmitter 29O. Similarly to the system 300, all the downstream control ports 21 of every receiver hub 10R are available for controlling and managing motion platforms 16.

More precisely, even if in the embodiments illustrated in FIGS. 2 to 4 the synchronizing unit 40 provides the input signal 20I to only one hub 10' (which forwards the motion signal to other hubs 10), the synchronizing unit 40 is adapted to provide an input signal 20I to a plurality of hubs 10 or motion platforms 16. In another embodiment, the synchronizing unit 40 may be part of the server 25, or the synchronizing tasks may be performed by the server 25.

It will be appreciated that using the system 200, 300 or 400, it is possible to control a plurality of motion platforms 16 or hubs 10 using a single server 25 and a single synchronizing unit 40. An exemplary setting for the presently described embodiments is a movie theatre in which a plurality of motion platforms are required, each motion platform hub handling given arrays of motion platforms. In another embodiment, the system uses a single server 25 connected to one of the hubs 10, with the connected hub 10 forwarding the network address to other hubs via the motion platform interfaces 14.

In the systems 200 and 400, the motion platforms 16 are only active when the motion signal 20 provided by the synchronizing unit 40 is in the active state. When the motion signal 20 generated by the synchronizing unit 40 is in the standby state, the standby state is forwarded to the motion platforms 16 and the motion platforms 16 are consequently lowered to their standby mode. In the case of the system 300, the downstream control ports 21 are only in the active state when the input signal 20I is actually generated by the synchronizing unit 40 and received at the wired data signal input port 27I. When no data is being received, the downstream control ports 21 are placed in the standby state and the motion platforms 16 are consequently lowered to their standby mode. In one embodiment, the standby mode can also be based on logical rules such as point-to-point protocol over Ethernet (PPoE), a variant of PPoE or any point-to-point protocol (PPP).

In one embodiment, if a fault occurs on one of the motion platforms 16, the communication with the server 25 will be maintained. The adaptor 56 of the faulty motion platform 16 detects the type of error and based on the type of error, the motion platform 16 may be stopped. In another embodiment, the server 25 may reactivate the motion platform 16. A user interface may be provided at the seat, in communication with the adaptor 56, for the user of the seat to control a level of actuation of the motion platform 16.

It will be appreciated that due to transmission delays, each of the hubs 10 may be calibrated to delay a motion playback by an adjustable amount of time. The skilled addressee will appreciate that it takes approximately 3 ms for sound to travel 1 m or air space. Therefore, distances of 10 m or more, which are typical distances between a speaker and a listener, introduce delays of about 30 ms. While this is not critical when considering only audio and video as a listener can tolerate a large amount of de-synchronization between audio and video, the synchronization must be more accurate between audio and motion. Each hub 10 or the server 25 may therefore include a delay generator to introduce a motion delay depending on a physical position of an element with respect to a main speaker. In one embodiment, a given motion delay is programmed in each motion platform interface 14. In another embodiment, a given motion delay can be programmed in each motion platform 16. The server 25 can be adjusted for a specific pass-through delay but if the signal received by a motion platform 16 passes through several hubs 10 on its way, the total delay is the sum of the delays encountered at hub in the chain. Accordingly, to facilitate the management of pass-through delays, it is possible to adjust in servers 25 the delays of mid-level hubs 10 to a minimum delay and only introduce a motion delay at the server directly managing motion platforms 16. Also in order to minimize the total delay, it is best to limit the number of hubs 10 that the signal must go through to a minimum.

The skilled addressee will appreciate that while the embodiments disclosed in FIGS. 2 to 4 show a given number of servers 25, hubs 10 and motion platforms 16, an arbitrary number of motion platforms 16 may be controlled using different configurations of hubs 10. It should also be understood that, a given server 25 may be connected to one or more hubs 10. Similarly, a given hub 10 may be connected to one or more motion platform 16 and/or to one or more hubs 10.

The skilled addressee will appreciate that while in one embodiment all hubs 10 are powered using a single power source, each hub 10 may also be powered using a separate power source.

Now referring to FIGS. 1A, 1B, 2 and 5, there is provided an example method for distributing a motion signal synchronized with a sequence of images to a plurality of motion platforms 16.

According to 48, a network address is provided for each motion platform according to the control protocol. According to step 50, an input signal 20 synchronized with a sequence of images is received. In one embodiment, the input signal 20 is received from the upstream device through the upstream control port 19. In one embodiment, the input signal 20 is provided by the synchronizing unit 40 to one first hub 10'. It will be understood that the input signal 20 is synchronized with the sequence of images. In one embodiment, the sequence of images is a movie.

In one embodiment, the input signal comprises a sequence of motion samples in the form of a stream of motion samples having a sampling rate and the input signal 20 is formatted such that the stream of motion samples is synchronously provided with the sampling rate.

According to 52, the motion signal is extracted from the received input signal 20. In an embodiment, the motions samples are split apart from the control data included in the input signal 20 according to the control protocol.

According to 54, a client motion signal 20A-20D comprising the extracted synchronized motion signal, the network address and commands is generated according to the control protocol, for each motion platform to be actuated. In one embodiment, the network address and the commands are generated by the server 25 which broadcasts this data to the motion platform interfaces 14. The motion platform interfaces 14 generate the client motion signals 20A-20D for the motion platforms 16 connected to the hub 10'.

According to 56, a feedback signal 22 is received according to the control protocol from each motion platform connected and comprises the network address of the motion platform 16 sending the feedback. The feedback signals 22 are used in managing the respective motion platform 16. Each motion platform 16 is managed individually according to the network address.

For illustration purposes, the number of downstream control ports 21 of the hub 10 of FIGS. 1A, 1B and 2 to 4 is limited to four, but it is noted that this number may be higher.

It is noted that the motion platform interface 14 and the input unit 12 could be provided as separate units or combined into two sub-units exchanging data.

The skilled addressee will appreciate that the embodiment disclosed enables the provision of an actuation data signal to a plurality of actuation devices. In the illustrated embodiments, the actuation devices consist of motion platforms but it is noted that a server such as the ones described herein could also be used to command another type of actuation device.

The skilled addressee will appreciate that motion platform refers herein to any vibrokinetic platform including a motion platform for providing only vibrations to the user, the provided vibrations being typically related to the sound track of a movie and thus being indirectly synchronized with a sequence of images.

While illustrated in the block diagrams as groups of discrete components communicating with each other via distinct data signal connections, it will be understood by those skilled in the art that the illustrated embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the described embodiment.

It should be noted that the present invention can be carried out as a method, can be embodied in a system, a computer readable medium or an electrical or electro-magnetical signal.

The embodiments described above are intended to be exemplary only. The scope of the invention is therefore intended to be limited solely by the scope of the appended claims.

The invention claimed is:

1. A system for providing, to a plurality of motion platforms, motion signals indicative of a motion to be performed by the motion platforms synchronously with video images, the system comprising:
   an input interface for receiving an input signal including said motion signal;
   at least one server for providing a network address to each motion platform of the plurality and for individually monitoring each motion platform of the plurality according to the network address of each motion platform;
   at least one motion platform interface comprising at least one control port; and
   at least one array of multiple motion platforms, each of the at least one array being connected to a respective one of the at least one control port, each of the at least one array consisting of a wired connection connecting the multiple motion platforms of said at least one array one to another in a daisy chain,
   wherein said at least one motion platform interface individually manages each of said motion platforms of the at least one array by communicating with any one of the motion platforms using the provided network address, the at least one motion platform interface sending the motion signal to each motion platform of said at least one array, each motion platform of said at least one array to be managed according to a respective feedback signal to be received from at least one of said motion platforms of said at least one array, the feedback signal comprising the provided network address of the respective motion platform of said at least one array.

2. The system of claim 1 wherein the server comprises:
   a network address provider for providing the network address to the motion platform interface for each motion platform of the at least one array to be actuated; and
   a command unit for sending commands to the motion platform interface for each motion platforms of the at least one array to be actuated.

3. The system as claimed in claim 1, wherein said motion signal comprises a stream of motion samples having a sampling rate and wherein said input signal is formatted such that said stream of motion samples is synchronously provided with said sampling rate.

4. The system as claimed in claim 1, further comprising a delay generator for generating a given time delay in said motion signal according to a position of said motion platforms relative to sound speakers.

5. The system as claimed in claim 1, wherein each motion platform of said at least one array comprises at least one seat of a plurality of seats in a movie theatre.

6. A method for distributing motion signal synchronized with a sequence of images to a plurality of motion platforms, said method comprising:
   providing a network address for each of multiple motion platforms of at least one array, said at least one array being connected to a respective control port of a distribution network hub, each of the at least one array consisting of a wired connection connecting one to another the multiple motion platforms of said at least one array in a daisy chain;
   receiving an input signal including said motion signal;
   sending the motion signal to each motion platforms of said at least one array as a function of the network address; and
   receiving, from at least one of the motion platforms of said at least one array, a feedback signal with the network address.

7. The method as claimed in claim 6, further comprising managing each motion platform of said at least one array according to the respective feedback signal and to said network address of each motion platform of said at least one array.

8. The method as claimed in claim 6, further comprising sending commands to any one of the motion platforms of the plurality of said at least one array using the provided network address.

9. The method as claimed in claim 6, further comprising generating a time delay in said motion signals according to a position of said motion platforms of said at least one array relative to sound speakers.

10. A system for receiving an input signal and providing motion to a plurality of seats as a function of the input signal, the system comprising:
    a distribution network hub for providing a motion signal synchronized with a sequence of images and indicative of the motion, said hub comprising at least
    an input interface for receiving the input signal including said motion signal, and
    at least one motion platform interface comprising at least one control port, the at least one control port for actuating said seats of the plurality according to said motion signal; and at least one array of multiple motion platforms with each said motion platform adapted to support at least one seat of the plurality, each of the at least one array consisting of a wired connection connecting the multiple motion platforms of said at least one array one to another in a daisy chain, each of said at least one array being connected to a respective one of the at least one control port, each motion platform of said at least one array being connected one to another by a wired connection to provide the motion to said seats with said motion signal.

11. The system as claimed in claim 10 further comprising:
a network address provider for associating a network address to each seat of the plurality; and
a command unit for sending commands to any one of motion platforms of the at least on array, the commands including the provided network address of the commanded motion platform.

12. The system as claimed in claim 10, wherein each motion platform comprises a motion adaptor for receiving commands from the command unit and for sending a feedback signal to the command unit.

13. The system as claimed in claim 10, wherein the at least one motion platform interface independently actuates each of said seats of said at least one array according to the client motion signal.

14. The system as claimed in claim 12, wherein each seat of said at least one array is to be managed according to a respective feedback signal comprising the respective network address to be received from respective ones of said seats of said at least one array.

15. The system as claimed in claim 10, wherein the wired connection between the motion platforms in the at least one array forms a loop with respect to the control port to which the array is connected.

* * * * *